Patented Jan. 22, 1929.

UNITED STATES PATENT OFFICE.

ROBERT EMANUEL SCHMIDT, OF ELBERFELD, GERMANY, ASSIGNOR TO GRASSELLI DYESTUFF CORPORATION, OF NEW YORK, N. Y., A CORPORATION OF DELAWARE.

4-8-DIMETHYLAMINO-1-5-DIHYDROXY-ANTHRAQUINONE.

No Drawing. Application filed April 13, 1926, Serial No. 101,777, and in Germany April 17, 1925.

I have found new and useful improvements in 4-8-dimethylamino-1-5-dihydroxy-anthraquinone of which the following is a specification.

In my application Serial No. 101,781 filed on even date, I have described new substances which are alpha-dimethylamino-dihydroxy-anthraquinone-disulfonic acids. In my application, Serial No. 101,780, filed on even date I have further described a novel and improved process of splitting off sulfo groups from anthraquinone sulfonic acid derivatives which consists in reducing such anthraquinone sulfonic acid derivatives to hydrocompounds and treating the latter with an alkaline agent.

I have now found that by splitting off both sulfo groups from the 4-8-dimethylamino-1-5-dihydroxy-anthraquinone-2-6-disulfonic acid of the formula

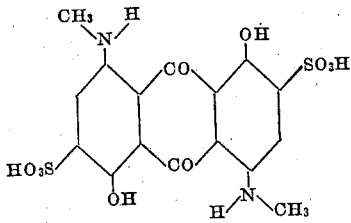

a dimethylamino-anthrarufin of the formula

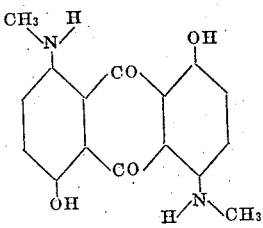

is obtained.

My new product is a dark blue powder, soluble in the usual organic solvents, substantially insoluble in water. It crystallizes from nitrobenzol in beautiful needles. Its solution in pyridin is blue, but of a much greener shade than a pyridin solution of p-diamino-anthrarufin. It dissolves in concentrated sulfuric acid with a yellow color, which turns greenish-blue on addition of boric acid; the latter solution shows a characteristic absorption spectrum, the lines of which are more towards the red end of the spectrum than in the case of the p-diamino-anthrarufin.

This new p-dimethylamino-anthrarufin is adapted to be used as raw material for the production of valuable dyestuffs.

The elimination of the sulfo groups from the p-dimethylamino-anthrarufin-disulfonic acid can be achieved by the known method used in the series of unmethylated alpha-amino-anthrarufin-sulfonic acids, which method consists in acting with sulfuric and boric acid upon such compounds. But my new process of acting with alkaline agents upon hydrocompounds of anthraquinone-sulfonic acid derivatives is particularly adapted to the production of the 4-8-dimethylamino-1-5-dihydroxy anthraquinone.

The following example will further illustrate my invention, the parts being by weight.

*Example 1.*—30 parts of p-dimethylamino-anthrarufin-disulfonic acid of the formula

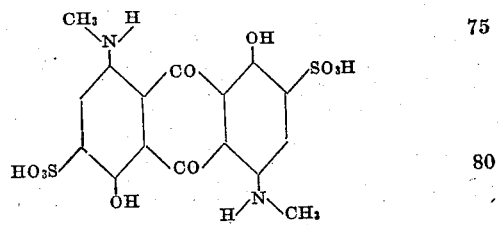

are dissolved at 60° C. in 1100 parts of water containing 30 parts of crystallized sodium carbonate and 25 parts of (82%) sodium hydrosulfite ($Na_2S_2O_4$) are then added, the color changing from greenish-blue to orange. The temperature is now increased to 80° C., an aqueous solution of 70 parts of crystallized sodium carbonate added and heated to 95° C. The orange color of the solution changes from red to blue and an abundant precipitate separates. After it does not increase any further, it is filtered off, treated with dilute acetic acid, filtered again and washed neutral with water. The product obtained is 4-8-dimethylamino-1-5-dihydroxy-anthraquinone of the formula.

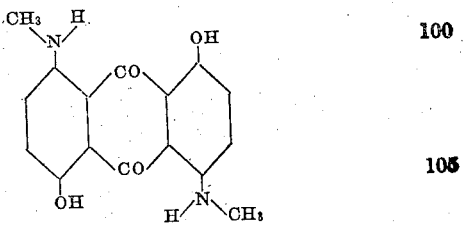

It is a dark blue powder, soluble in the usual organic solvents and substantially insoluble in water. It crystallizes from nitrobenzol in beautiful needles. Its solution in pyridin is blue, but of a much greener shade than a pyridin solution of p-diamino-anthrarufin. It dissolves in concentrated sulfuric acid with a yellow color which turns greenish-blue on addition of boric acid; the latter shows a characteristic absorption spectrum, the lines of which are more towards the red end of the spectrum than in the case of the p-diamino-anthrarufin.

The term "hydro-compound" used in the claims is intended to define the compounds obtainable by reducing a substituted anthraquinone sulfonic acid compound in a substantially neutral or weakly alkaline solution as more fully described in the co-pending application Serial No. 101,780, filed on even date herewith. The hydro-compound, which is believed to differ from the parent material in that its quinone group is typified by the constitution

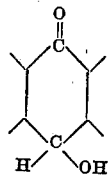

is distinguished from the corresponding leuco compound by the fact that its alkaline solution is not readily oxidized by means of air to re-form the parent material. Furthermore, it will, with the greatest facility, split off a sulfo group which is eliminated as sulfurous acid or a salt thereof.

This application contains subject matter in common with my application Serial No. 101,780 filed on even date.

I claim:

1. Process of making 4-8-dimethylamino-1-5-dihydroxy-anthraquinone which comprises reducing 4-8-dimethylamino-1-5-dihydroxy-anthraquinone-2-6-disulfonic acid to the corresponding hydrocompound by treatment in a substantially neutral medium with an alkali metal hydrosulfite and heating the resulting hydrocompound in an aqueous alkaline solution at a temperature of from about 80° to about 95° C.

2. Process of making 4-8-dimethylamino-1-5-dihydroxy-anthraquinone which comprises treating the hydrocompound of 4-8-dimethylamino - 1 - 5 - dihydroxy - anthraquinone-2-6-disulfonic acid with an aqueous alkaline solution containing about 2 per cent of sodium carbonate at a temperature of from about 80° to about 95° C.

In testimony whereof I have hereunto set my hand.

ROBERT EMANUEL SCHMIDT.